United States Patent [19]

Spurrier

[11] 4,194,647
[45] Mar. 25, 1980

[54] COOLER CHEST AND DISPENSER STRUCTURE

[76] Inventor: Harry A. Spurrier, 315 S. 8th St., Conway Springs, Kans. 67031

[21] Appl. No.: 873,555

[22] Filed: Jan. 30, 1978

[51] Int. Cl.² .................... A47F 1/10; B65G 59/06
[52] U.S. Cl. .................................... 221/97; 221/197; 221/247; 221/256; 221/312 R
[58] Field of Search ................. 221/12, 92, 97, 150 R, 221/196, 197, 247, 248, 256, 257, 261, 263, 264, 266, 286, 312 R

[56] References Cited

U.S. PATENT DOCUMENTS

| | | | |
|---|---|---|---|
| 533,197 | 1/1895 | Jaeger | 221/266 X |
| 2,432,749 | 12/1947 | Glassford | 221/196 X |
| 2,576,874 | 11/1951 | Acton | 221/266 X |
| 2,638,395 | 5/1953 | Smith | 221/264 X |
| 3,472,421 | 10/1969 | Baller | 221/196 |
| 3,549,045 | 12/1970 | Rosenhagen | 221/12 |
| 3,578,207 | 5/1971 | Danow | 221/247 X |

FOREIGN PATENT DOCUMENTS 849441  9/1960  United Kingdom ................ 221/266

*Primary Examiner*—F. J. Bartuska
*Attorney, Agent, or Firm*—Phillip A. Rein

[57] ABSTRACT

This invention relates to a cooler chest and dispenser structure including a can or object dispenser assembly releasably mounted in a cooler chest assembly. The cooler chest assembly has a main container body with a lid member connected to the main container body and operable in a conventional manner to provide access thereto. One endwall of the main container wall is provided with a rectangular opening that is covered with an access door assembly. The access door assembly includes a door member movable from opened to closed conditions relative the rectangular opening. The can dispenser assembly includes the access door assembly; a dispenser container structure; and a dispenser drawer structure connected to the dispenser container structure and positioned adjacent the access door assembly to dispense a can or similar object therethrough. The dispenser container structure includes a support body having separator wall structures therein to hold parallel rows of can members thereto to dispense same downwardly under the force of gravity. A bottom horizontal row of the can members are off-set with the vertical rows of can members to provide a continuous force toward dispensing a can member into the dispenser drawer structure. The dispenser drawer structure is operable to receive a can member therein and move laterally of the dispenser container structure and the door member so that can members may be dispensed therefrom without opening the lid member to conserve cool air therein.

4 Claims, 4 Drawing Figures

COOLER CHEST AND DISPENSER STRUCTURE

PRIOR ART

Article dispensing devices are known to the prior art operable to individually dispense an object singularly. The following patents are noted:

U.S. Pat. No. 2,432,749 to Glassford
U.S. Pat. No. 2,576,874 to Acton
U.S. Pat. No. 3,472,421 to Baller The Baller patent teaches the use of a straw dispenser to dispense straw members one at a time. The Glassford patent teaches use of a gravity fed track holding, chilling, and dispensing cylindrical articles.

The most pertinent prior art patent located is the Acton patent teaching the use of an insulated chest with a slidable tray to dispense bottle members therefrom. However, the applicant's invention includes patentable features thereover.

PREFERRED EMBODIMENT OF THE INVENTION

In one preferred embodiment of the invention, a cooler chest and dispenser structure is provided being operable to singularly dispense an article such as a soda pop can member, without opening a lid member to conserve the source of coolant. The cooler chest and dispenser structure includes a can dispenser assembly connected to a cooler chest assembly. The cooler chest assembly includes a main container body having a lid member hinged to the main container body. The lid member is movable from opened to closed positions relative the main container body to provide access thereto in a conventional manner. The can dispenser assembly includes an access door assembly mounted about a rectangular opening in an endwall of the main container body; a dispenser container structure mounted in the main container body; and a dispenser drawer structure slidably mounted in the dispenser container structure and operably associated with the access door assembly. The access door assembly includes a vertically movable door member mounted in a door frame member to selectively open and close the rectangular opening. The dispenser container body includes a support body to hold parallel, vertically aligned rows of can members or the like and operable to singularly dispense a can member under gravity into the dispenser drawer structure. The dispenser drawer structure is provided with a cavity to receive a can member from the dispenser container body for subsequent movement laterally of the door member. The can member can then be removed from the cavity and the dispenser drawer structures can be slid back into the dispenser container body to receive another can member for subsequent dispensing therefrom.

OBJECTS OF THE INVENTION

One object of this invention is to provide a cooler chest and dispenser structure including a cooler chest assembly being operable to hold a plurality of objects such as beverage containers and dispense same through a slidable drawer structure to minimize coolant losses from the cooler chest assembly.

Another object of this invention is to provide a cooler chest and dispenser structure including a can dispenser assembly mounted in a cooler chest assembly wherein the can dispenser assembly is readily removed from the cooler chest assembly for (1) loading or unloading of the can dispenser assembly, or (2) using the cooler chest assembly as a conventional ice chest.

One further object of this invention is to provide a cooler chest and dispenser structure having a dispenser container structure operable to hold a plurality of vertical rows of objects such as can members with a bottom horizontal row off-set from the vertical rows whereby the force of gravity acts to automatically eject can members therefrom.

One other object of this invention is to provide a cooler chest and dispenser structure including a can dispenser assembly mounted in a cooler chest assembly wherein the can dispenser assembly has a dispenser drawer structure selectively movable lateral of the cooler chest assembly to dispense a single object therefrom.

Still, one other object of this invention is to provide a cooler chest and dispenser structure that can be (1) used as a conventional ice chest or a can dispensing structure; (2) constructed of a durable, attractive plastic material; (3) simple and reliable in operation; and (4) conserve energy as allowing the dispensing of objects therefrom with a minimum loss of coolant therefrom.

Various other objects, advantages, and features of the invention will become apparent to those skilled in the art from the following discussion, taken in conjunction with the accompanying drawings, in which:

FIGURES OF THE INVENTION

Figure 1:
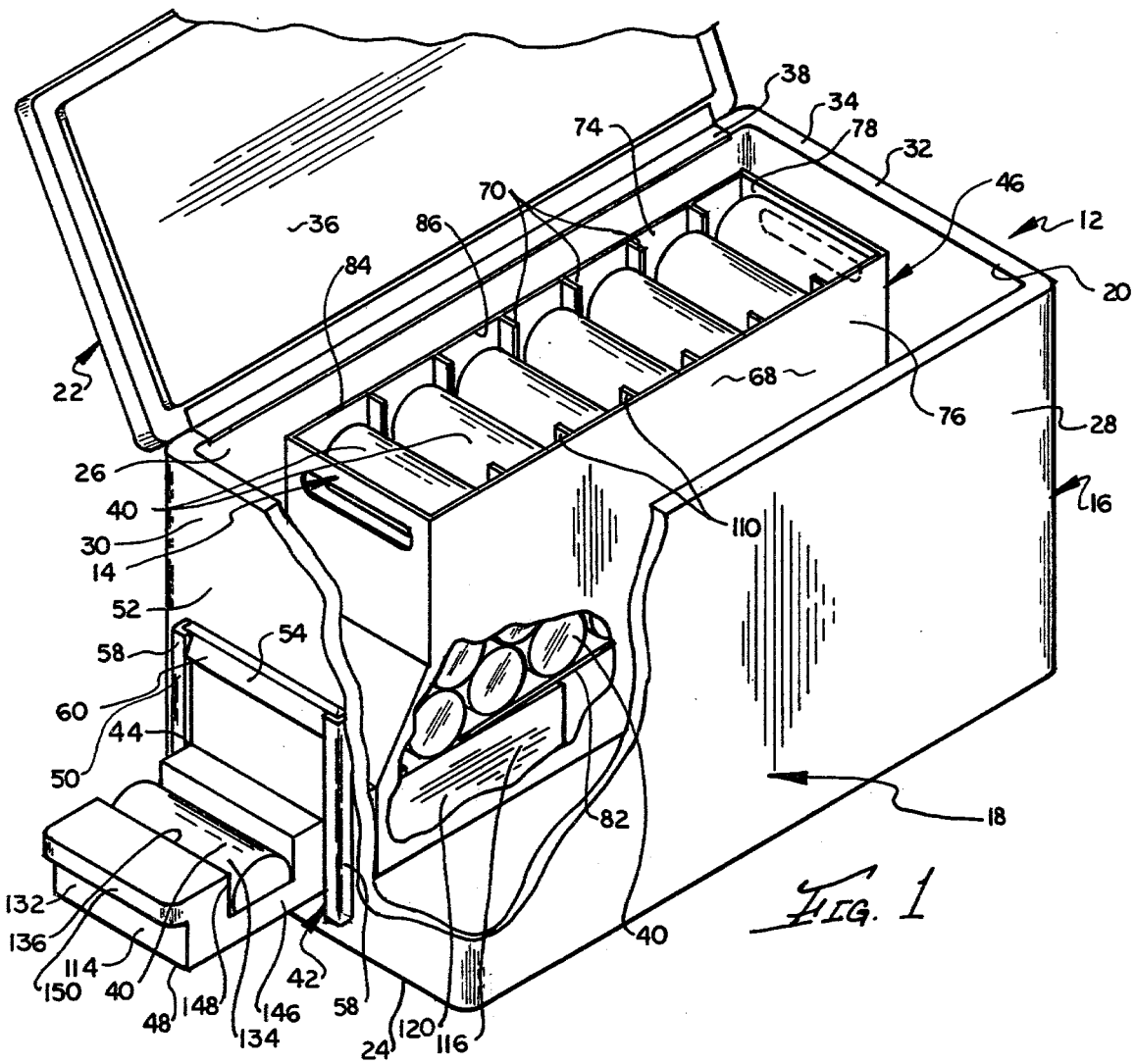
FIG. 1 is a perspective view of a cooler chest and dispenser structure of this invention having portions broken away for clarity.

The following is a discussion and description of preferred specific embodiments of the new cooler chest and dispenser structure of this invention, such being made with reference to the drawings, whereupon the same reference numerals are used to indicate the same or similar parts and/or structure. It is to be understood that such discussion and description is not to unduly limit the scope of the invention.

SPECIFICATION OF THE INVENTION

Referring to the drawings in detail and in particular to FIG. 1, a cooler chest and dispensing structure of this invention, indicated generally at 12, includes a can or object dispenser assembly 14 mounted in a cooler chest assembly 16. The cooler chest assembly 16 resembles a conventional ice chest including a main container body 18 with an upper large rectangular opening 20 which is selectively opened and closed by a lid member 22.

The main container body 18 is of a rectangular box-shape having a bottom wall 24 with integral upright sidewalls 26, 28, and endwalls 30, 32. The sidewalls 26, 28 and endwalls 30, 32, have an upper, common horizontal surface 34 which is selectively sealed by the lid member 22.

The lid member 22 includes a lid body 36 having a hinge member 38 connecting the lid body 36 to the surface 34 of the sidewall 26. It is obvious that a latch member (not shown) can be used to selectively anchor the lid member 22 to the main container body 18.

The main container body 18 and interconnected lid member 22 are constructed of an insulation material to prevent heat transfer therethrough. This invention is primarily drawn to the can dispenser assembly 14 being operable to dispense objects, such as can members 40 from the main container body 18 without opening the lid member 22 so as to minimize temperature loss from the cooler chest assembly 16.

Figure 2:
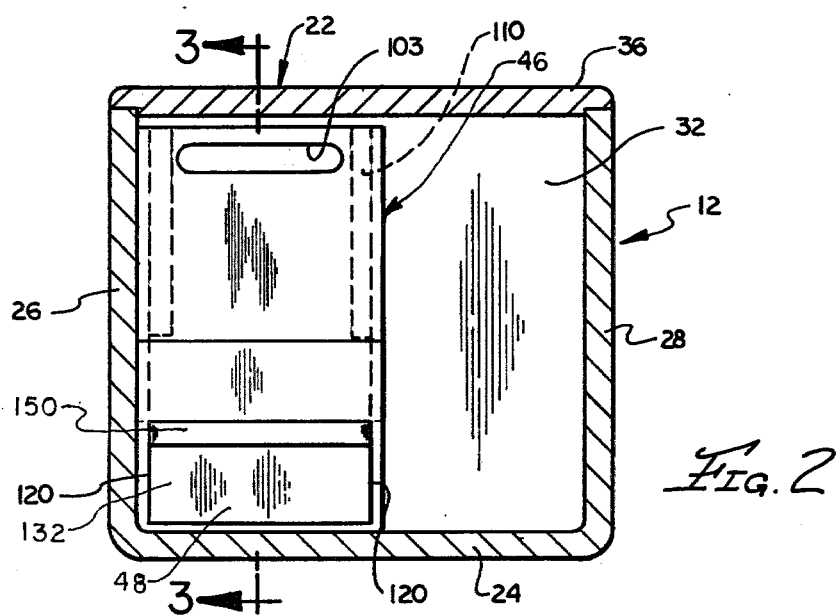
FIG. 2 is a sectional view of the cooler chest and dispenser structure of this invention taken adjacent an inside surface of a dispensing endwall and having a lid member shown in the closed position.

As shown collectively in FIGS. 1 and 2, the can dispenser assembly 14 includes (1) an access door assembly 42 mounted in the endwall 30 to selectively open and close a rectangular opening 44 therein; (2) a dispenser container structure 46 mountable in the main container body 18; and (3) a dispenser drawer structure 48 mounted in the dispenser container structure 46 and selectively movable lateral of the access door assembly 42 to deliver a can member 40 outwardly therefrom.

More particularly, the access door assembly 42 includes (1) a door frame member 50 secured to an outer surface 52 of the endwall 30 about the rectangular opening 44; (2) a door member 54 slidably movable vertically with the door frame member 50; and (3) a seal member 56 connected to the door member 54 and engageable with the outer surface 52 of the endwall 30.

The door frame member 50 includes a pair of opposed runner members 58 of L-shape in transverse cross section. The runner members 58 cooperate to hold the door member 54 therebetween for vertical movement thereof.

The door member 54 is of rectangular shape and of a size so as to seal about the rectangular opening 44 in the endwall 30. The door member 54 is formed with a handle portion 60 to aid in grasping and moving vertically and, on a back surface 62, is formed with a peripherial cut-out section 64 to receive the seal member 56 therein.

The seal member 56 may be constructed of a flexible, rubber type material to prevent fluid seepage thereabout.

The dispenser container structure 46 includes a main support body 68 having a plurality of separator wall members 70 therein. The main support body 68 includes a bottom wall section 72 integral with parallel sidewall sections 74, 76; a vertical endwall section 78; an inclined endwall section 80; and in inclined support wall section 82 mounted about the bottom wall section 72. The uppermost edges 84 of the sidewall sections 74, 76 and the endwall sections 78, 80 form a large opening 86 for ease in adding can members 40 or the like to the main support body 68.

The inclined support wall section 82 forms a cavity 88 between same and the bottom wall section 72 for reasons to be explained. The support wall section 82 inclines downwardly from the endwall section 78 to the inclined endwall section 80 so that can members 40 will roll under the force of gravity toward an opening 90 into the dispenser drawer structure 48.

The inclined endwall section 80 formed with an upper, vertical portion 92; an inclined wall portion 94; a rectangular drawer opening 96 in between the inclined wall portion 94 and the bottom wall section 72; and a seal member 98 mounted about the rectangular drawer opening 96. The upper vertical portion 92 plus an upper area 101 of the vertical endwall section 78 are each formed with a cut-out groove 103 to receive one's hand therein for ease of conveyance of the entire dispenser container structure 46.

An outer ledge portion 105 of the inclined wall portion 94 is spaced outwardly of an edge 107 of the support wall section 82 to form a discharge opening 108 through which a can member 40 can fall into the dispenser drawer structure 48. A mid-point 109 of the inclined wall portion 94 is off set about one-half of a width of a can member 40 from the upper vertical portion 92 to provide desired forces for dispensing the can members 40 under gravity force.

The separator wall structures 70 comprise pairs of opposite, parallel lug members 110 secured to respective ones of the sidewall sections 74, 76 to form guides for vertical rows of the can members 40. Each lug member 110 has a bottom edge 112 spaced upwardly of the inclined support wall section 82 to allow a can member 40 or other such object to pass thereunder.

The dispenser drawer structure 48 is of a box-like construction including a dispenser end section 114 integral with a guide or retaining block end section 116. The block end section 116 includes a front wall 118 integral with parallel sidewalls 120 and a top wall 122. The sidewalls 120 act as a guide on sliding movement of the dispenser drawer structure 48 as shown by an arrow 124.

The top wall 122 acts as a retaining plate to contact a can member, indicated at 126, while a can member, indicated at 128, is being dispensed on lateral movement of the dispenser drawer structure 48. A forward edge 130 of the top wall 122 contacts the can member 126 to prevent its downward movement until the can member 128 is removed from the dispenser end section 114 and the dispenser drawer structure 48 is then moved to its non-use condition as shown in solid lines in FIG. 3.

The dispenser end section 114 includes a forward handle section 132 integral with a container section 134. The container section 134 is integral with the block end section 116 and includes a rectangular groove 136 to receive a can member 40 or the like therein (FIG. 1). The container section 134 has a bottom wall section 144 integral with opposed sidewall sections 146.

The handle section 132 provides a vertical retaining wall 148 for a can member 40 and has a forward handle portion 150 to be grasped by one's hand to move the entire dispenser drawer structure 48 relative to the access door assembly 42.

USE AND OPERATION OF THE INVENTION

As noted in FIG. 1, the cooler chest assembly 16 resembles a conventional portable cooler adapted to cool cans, bottles, etc. therein with the use of ice particles. The lid member 22 is readily opened to gain access to the main container body 18 but this causes considerable heat to enter and melt the ice particles. A main object of this invention is to allow removal of objects in the main container body 18 without opening of the lid member 22.

The can dispenser assembly 14 includes the dispenser container structure 46 which can be carried by one's fingers in the grooves 103 in the opposed end wall sections 78, 80. This allows the dispenser container structure 46 to be removed from the main container body 18 when not to be used therewith.

Figure 3:
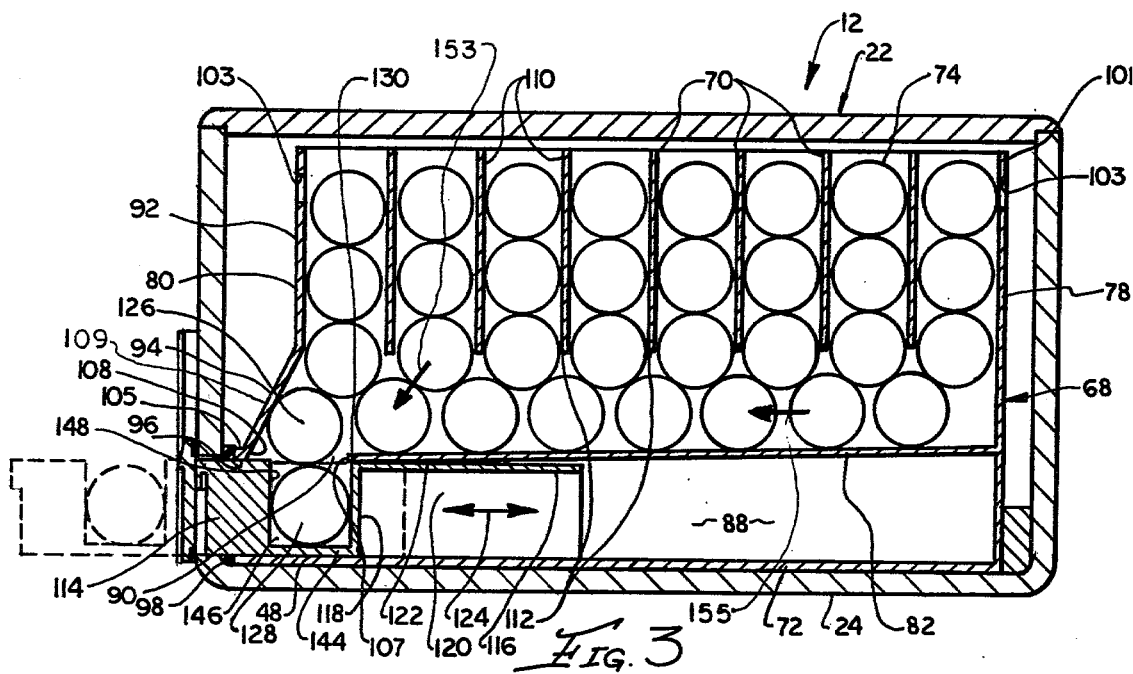
FIG. 3 is a sectional view taken along line 3—3 in FIG. 2 illustrating an entire cooler chest assembly and dispenser drawer structure and showing a dispensing position in dotted lines.
Figure 4:
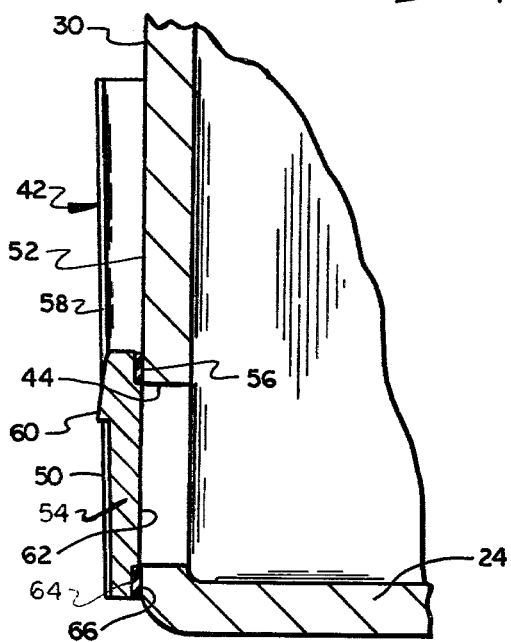
FIG. 4 is an enlarged fragmentary sectional view of an access door assembly of the cooler chest and dispenser structure of this invention.

In the usage condition of FIG. 1, the can dispenser assembly 14 is placed in the main container body 18 to position the dispenser drawer structure 48 adjacent the door member 54. The support body 68 of the dispenser container structure 46 is filled with can members 40 in a stacked and offset relationship as shown in FIG. 3. Due to the offset and the slant of the support wall section 82, a downward force is exerted between stacked can members 40 as shown by an arrow 153. Similarly, a lateral force is exerted between substantially horizontally abutting can members 40 as shown by an arrow 155. These forces act to automatically dispense the can members 40 into the rectangular groove or opening 136 in the dispenser drawer structure 48.

As noted in FIG. 1, the door member 54 is movable vertically to expose the dispenser end section 144 of the dispenser drawer structure 48. The handle portion 150 is grasped by one's finger to move the dispenser drawer structure 48 outwardly as shown by arrow 124 to the position as shown by dotted lines in FIG. 3. The particular can member 40 in the groove 136 can be removed and the dispenser drawer structure 48 returned to the position shown in solid lines in FIG. 3. This then automatically allows the can member 126 to fall into the container groove or opening 136 for subsequent dispensing. The door member 54 then is returned to the closed position.

It is seen that the cooler chest and dispenser structure operates to allow dispensing of can members or the like individually from a cooler chest assembly without opening the lid member. The use of the dispenser drawer structure operates to achieve a minimum amount of heat transfer when dispensing an item from the cooler chest assembly.

While the invention has been described in conjunction with preferred specific embodiments thereof, it will be understood that this description is intended to illustrate and not to limit the scope of the invention, which is defined by the following claims.

I claim:

1. A cooler chest and dispenser structure operable to individually dispense objects therefrom such as can members, comprising:
   (a) a cooler chest assembly having a can dispenser assembly operably connected thereto;
   (b) said cooler chest assembly includes a main container body to receive the objects therein and a lid member connected to said main container body to open and close an access opening thereto;
   (c) said can dispenser assembly includes an access door assembly connected to said main container body; a dispenser container structure releasably mounted in said main container body; and a dispenser drawer structure mounted in said dispenser container structure and positioned adjacent said access door assembly;
   (d) said access door assembly having a door member movable vertically from opened to closed positions about an opening in said main container body;
   (e) said dispenser drawer structure includes a dispenser end section to receive an object therein and integral with a block end section;
   (f) said dispenser drawer structure is movable to a position outwardly of said door member to present an object for removal from said dispenser end section while, simultaneously, said block end section holds the other objects in the same position;
   (g) said dispenser drawer structure is movable to a start position within said dispenser container structure and another object automatically moves into said dispenser end section for subsequent dispensing;
   (h) said access door assembly having a door frame member secured to an outer surface of said main container body about said opening therein; and
   (i) said door frame member having a pair of spaced vertically extended support members to receive said door member therein for the vertical movement from opened to closed positions.

2. A cooler chest and dispenser structure as described in claim 1, wherein:
   (a) said door member having a seal member on a back surface to contact said outer surface of said main container body in the closed position to form a seal therewith.

3. A cooler chest and dispenser structure as described in claim 1, wherein:
   (a) said main support body having an inclined end wall section adjacent said dispenser drawer structure;
   (b) said inclined end wall section having an upper vertical portion integral with a lower inclined wall portion; and
   (c) said lower inclined wall portion offset to provide vertical and lateral forces between adjacent objects to force the objects toward said dispenser drawer structure.

4. A cooler chest and dispenser structure as described in claim 1, wherein:
   (a) said dispenser container structure includes a main support body divided into a plurality of rows by separator wall structures to hold a plurality of rows of objects therein;
   (b) said main support body having an inclined support wall section to receive the objects thereon for support and movement under gravity to said dispenser drawer structure;
   (c) said inclined support wall section having an edge adjacent a discharge opening into said dispenser drawer structure;
   (d) said edge contacts a top wall of said block end section to form a seal therewith on lateral movement of said dispenser drawer structure and prevents cooled air within said cooler chest assembly from being dispensed therefrom;
   (e) said main support body having an inclined end wall section adjacent said dispenser drawer structure;
   (f) said inclined end wall section having an upper vertical portion integral with a lower inclined wall portion; and
   (g) said lower inclined wall portion offset to provide vertical and lateral forces between adjacent objects to force the objects toward said dispenser drawer structure.

* * * * *